3,832,280
COATING ASBESTOS FIBER WITH ALUMINUM SULFATE PRIOR TO FORMING A CEMENT-ASBESTOS SLURRY FROM THE TREATED FIBERS TO ENHANCE THE FILTERING CHARACTERISTICS OF THE SLURRIES
Charles Ernest Stiefken, Westfield, N.J., assignor to American Smelting and Refining Company, New York, N.Y.
Continuation-in-part of abandoned application Ser. No. 226,218, Feb. 14, 1972, which is a division of Ser. No. 869,754, Oct. 27, 1969, now Patent No. 3,644,138. This application Apr. 23, 1973, Ser. No. 353,259
Int. Cl. D21h 5/18
U.S. Cl. 162—154
4 Claims

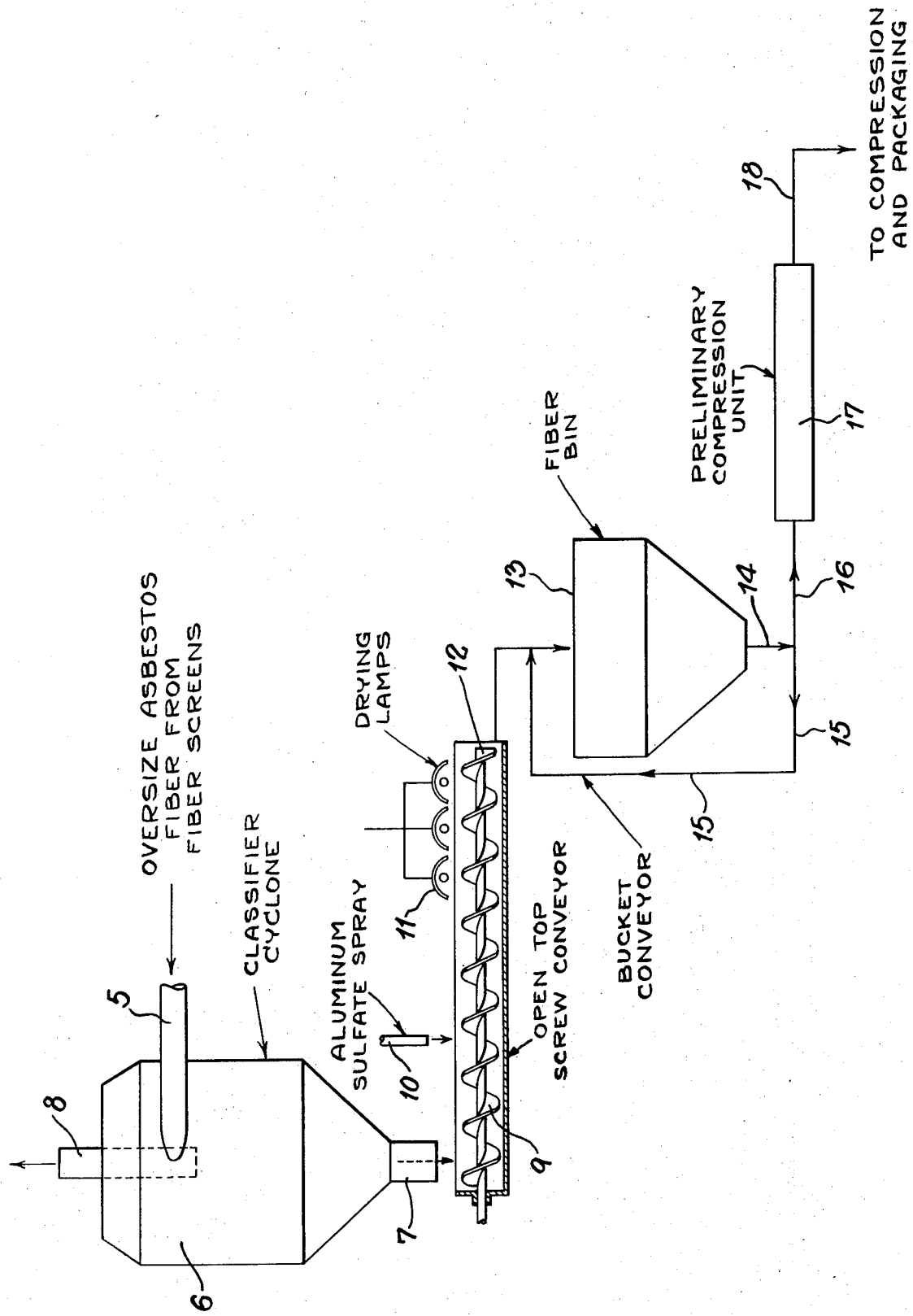

ABSTRACT OF THE DISCLOSURE

Asbestos fiber having aluminum sulfate deposited on its surfaces and especially well suited for forming fast-filtering asbestos-cement slurries, the preparation of such fiber, and the production of water-laid asbestos-cement products involving the formation of the fast-filtering asbestos-cement slurries utilizing the asbestos fiber having the aluminum sulfate previously deposited thereon. Such asbestos fiber product is preferably dry but can be only partially dry or wet.

CROSS REFERENCES TO RELATED APPLICATIONS

This is a continuation-in-part of application Ser. No. 226,218, filed Feb. 14, 1972, now abandoned, which in turn is a division of application Ser. No. 869,754, filed Oct. 27, 1969, now U.S. Pat. 3,644,138.

BACKGROUND OF THE INVENTION (1) Field of the Invention

This invention relates to improving the filtration characteristics of asbestos and more particularly to a new and improved asbestos fiber product especially well suited for forming fast filtering asbestos-cement slurries, a method of preparing the new and improved fiber product, and to an improvement in the method of producing water-laid asbestos-cement products wherein a considerable faster filtration rate of the asbestos-cement slurry is achieved during the production.

(2) Description of the Prior Art

Alkali metal silicates and phosphates have been deposited on asbestos fiber heretofor for improving filtration characteristics of the asbestos. High molecular weight polyacrylamides and naturally occuring guar gum have been added to asbestos-cement aqueous slurries by the asbestos-cement product producers, for improving the filtration rate of the asbestos-cement slurry. The use of the high molecular weight polyacrylamides and guar gum may result in clogging or plugging of the pores or openings of the felt, screen, perforated cylinder or other pourous means employed in forming the water-laid web of asbestos-cement. Papermaker's alum, $Al_2(SO_4)_3 \cdot 18H_2O$, and a water-soluble salt of an organic carboxylic acid having 10 or more carbons are also known in the prior art for addition to asbestos-cement slurries, as contrasted with deposition on the asbestos fiber prior to forming the slurry, for forming fast draining slurries, and are disclosed and claimed in U.S. Pat. 3,014,835. Although the addition of the alum and the salt of the organic carboxylic acid having 10 or more carbons to the asbestos-cement slurry is reported to give satisfactory results, there is room for improvement from the standpoint of speeding up the filtration rate of the asbestos-cement aqueous slurries inasmuch as the faster the draining or filtration rate, the greater the through-put and production rate of the asbestos-cement products. Hence it is readily seen that a considerable improvement in the filtration rate of asbestos-cement slurries should play an important role in the economics of the method of producing the asbestos-cement products. Further, the requirement of addition of additive materials to the asbestos-cement slurries by the asbestos-cement product manufacturer may put the manufacturer to an inconvenience, trouble and expense which he may not be desirous of having, and which would be obviated or eliminated by forming the slurry with asbestos fiber having the filtration-accelerating additive previously deposited thereon at the asbestos mill.

SUMMARY OF THE INVENTION

In accordance with the present invention, I have found that an asbestos fiber product of considerably improved filtration characteristics is attained by applying to the asbestos fiber only, as contrasted with applying to an asbestor-cement slurry, a liquid solution of aluminum sulfate. After application of the aluminum sulfate solution onto the fiber the thus-treated fiber is collected for packaging or other disposition. Although the aluminum sulfate solution-treated fiber will usually be dried after application of such solution and before collecting the fiber, it is not essential to dry the treated fiber or, if the fiber is dried, to dry it completely. The drying of the thus-treated fiber, if desired, can be effected by the application of external heat, or by simply allowing it to air dry or by other suitable means. The drying of the treated fiber serves to deposit aluminum sulfate solids on the fiber surfaces, the deposited aluminum sulfate solids adhering to the fiber surfaces.

The product asbestos fiber of this invention is composed of the asbestos fiber having the aluminum sulfate deposited on surfaces of the fiber. The fiber is ordinarily composed of a plurality of asbestos fibers or numerous such fibers intertwined or clumped together in the usual manner characteristic of asbestos fiber. However, although it is unlikely, a single fiber having the aluminum sulfate deposited on its surface can, if desired, constitute the asbestos fiber of the product of this invention. The aluminum sulfate-treated asbestos fiber of this invention when dry will of course contain moisture in an amount which is in equilibrium with that of the surrounding air. As brought out supra, however, the aluminum sulfate-treated asbestos fiber of this invention can, if desired, be wet, moist or only partially dry.

After application of the aluminum sulfate aqueous solution to the asbestos fiber and drying of the thus-treated fiber, the fiber can be fiberized, i.e. milled, if desired, to further liberate or free asbestos fiber which is agglomerated together by reason of the aqueous liquid of the aluminum sulfate solution. Such fiberizing of the aluminum sulfate-containing fiber does not adversely affect the considerable improvement in filtration rate of the asbestos-cement slurry, and this was unexpected and surprising as it was felt that the milling of the fiberizing would dislodge the adherent aluminum sulfate from the fiber surfaces to the extent of reducing materially faster filtration rate.

The asbestos fiber product of this invention is especially well suited for use in the production of water-laid cement-asbestos products by reason of achieving a considerably improved water filtration rate. In the production of the water-laid cement-asbestos products an aqueous slurry is fomed of the cement and the asbestos fibers, and a water-laid product is formed from the aqueous cement-asbestos fiber slurry by filtering or draining the water therefrom. The asbestos fiber and cement, such as Portland cement, are mixed together to form the cement-asbestos fiber slurry in a weight ratio of typically about 1:4 to 1:7 respectively. The utilization of the asbestos fiber product of this invention composed of the asbestos fiber having aluminum sulfate deposited on surfaces of the fiber per se as the fiber for forming the aqueous cement-asbestos fiber slurry, as contrasted with adding the aluminum sulfate to a previously formed aqueous cement-asbestos fiber slurry with the asbestos fiber free of the aluminum sulfate, attained a considerably faster rate of filtration of the water from the water-laid product.

The present invention is eminently well suited for improving the filtration characteristics of asbestos-cement slurries wherein the asbestos fiber is that normally found in the Province of Quebec, Canada, especially chrysotile fiber found in the Province. However the invention can also be practiced on other asbestos fiber as exemplified by amosite, cricidolite, anthrophyllite, tremolite and actinolite.

Any suitable aluminum sulfate is utilizable in accordance with this invention for deposition on the asbestos fiber. Thus the aluminum sulfate can be, for example, alum or papermaker's alum, i.e. $Al_2(SO_4)_3 \cdot 18H_2O$, $Al_2(SO_4)_3 \cdot 14H_2O$, $Al_2(SO_4)_3 \cdot 9H_2O$, or $Al_2(SO_4)_3$.

The asbestos-cement water-laid products preparable in accordance with this invention are exemplified by asbestos-cement water-laid products preparable in accordance with this invention are exemplified by asbestos-cement sheets, boards, pipe, shingles, panels, clapboards, corrugated siding and roofing sheets, tubing, and other products including various special shapes and forms of the material.

The aluminum sulfate-treated asbestos fiber of this invention is utilizable in asbestos-cement compositions or products wherein the cement comprises a common hydraulic cement containing, for example Portland cement or a slag cement. The asbestos cement may also contain silica either as a filler or reactant, and the assorted fillers, pigments, etc., commonly utilized in the industry.

BRIEF DESCRIPTION OF THE DRAWING

The accompanying drawing is a flow diagram for preparing the product asbestos fiber of the present invention.

DESCRIPTION OF THE PREFERRED EMBODIMENTS

The aluminum sulfate solution is preferably applied to the asbestos fiber by spraying the solution onto the fiber.

In one embodiment, the spraying may be an atomized spraying of the aluminum sulfate solution onto the asbestos fiber which is suspended in air or moving upwardly in an uprising column of air. In another embodiment the aluminum sulfate solution is sprayed onto the asbestos fiber while the fiber is passing through a conveyor, for instance a screw conveyor.

The asbestos fiber having the aluminum sulfate solution deposited thereon is preferably dried prior to being collected. Less preferably such fiber can be collected in a partially dry or in a wet state, and the drying step can be omitted.

The spraying treatment results in a thin deposit or coating of the aluminum sulfate on the fiber. The deposit or coating can be a discontinuous and/or continuous deposit or coating.

Although the amount of aluminum sulfate deposited or coated on the asbestos fiber can be varied over a wide range, it is preferred to deposit on the fiber an amount in the range of about 25–50 lbs. of the aluminum sulfate per ton of the fiber, more preferably about 30–40 lbs. thereof per ton, calculated as $Al_2(SO_4)_3$. With the preferred spray application, the aqueous solution of aluminum sulfate is of course a sprayable solution and will usually contain, by weight, about 15–50% of the aluminum sulfate, preferably about 20–30% of the aluminum sulfate, calculated as $Al_2(SO_4)3$.

In the production of the cement-asbestos products, the aqueous slurry can be formed of hydraulic cement, for instance Portland cement, with or without silica, and the product asbestos fiber, for example product chrysotile asbestos fibers of this invention composed of a preferably dry asbestos fiber having the aluminum sulfate deposited on its surfaces. A water-laid web is then formed from the cement-asbestos fiber slurry by filtering off a major portion of the water of the slurry so that the fiber and cement are deposited to form a continuous solid wet sheet on a formanous surface such as, for example, a water absorbent felt, a moving screen, or a screen-covered perforated cylinder under a partial vacuum. The web thus formed is usually further consolidated and dewatered by applying a partial vacuum to suction rolls or felts or by pressure rolls as the web advances through the machine.

With reference to the drawing, the oversize asbestos fiber from the fiber screens is pneumatically fed through tangentially disposed inlet 5 into classifier cyclone 6 wherein the asbestos fiber is cyclonically separated from the dust. The separated fiber is withdrawn from cyclone 6 through outlet 7, with the dust being withdrawn from the cyclone through outlet 8. The fiber is then conveyed through screw conveyor 9 having an open top. An aluminum sulfate aqueous solution is sprayed onto the asbestos fiber being conveyed through conveyor 9 by one or more spray nozzle 10. The aluminum sulfate solution is mixed with the fiber by the subsequent movement of the treated fiber through the screw conveyor.

The thus-treated fiber is then dried by radiant heat applied from a battery of drying lamps 11, such as infrared lamps, mounted above the discharge end of the open top conveyor 9 and in closely spaced relationship thereto. Alternatively any suitable or conventional drying means or system can be utilizable in place of the drying lamps 11. The dried fiber having the aluminum deposited on and adhered to its surfaces passes from the discharge end 12 of screw conveyor 10 into fiber bin 13. The fiber is withdrawn from bin 13 through outlet 14, and a minor or major portion of the fiber is returned to bin 13 via bucket conveyor 15 for purpose of blending. Alternatively the remaining fiber, or all fiber when no recycling of fiber to bin 13 is employed, from bin 13 is passed by conveyor 16 to the preliminary compression screw unit 17 wherein the fiber is compressed to a limited or relatively small extent. From preliminary compression unit 17 the fiber having the aluminum sulfate as sole filter aid deposited on and adhered to its surfaces is passed via conveyor 18 to the compression unit wherein it is compressed to the desired final extent, after which the compressed fiber is packaged.

The test data of Table I which follows, shows the improvement in filtration attained by spraying the asbestos fiber with the aluminum sulfate as potential filter aid or reagent over adding the potential filter aid directly to the asbestos-cement slurry. In carrying out the tests, in applying the potential filter aid to the fiber, 4T3 asbestos fiber obtained from the Black Lake region of Quebec Province, Canada was sprayed with an aqueous solution of the potential fiber aid, dried for thirty minutes at 212° F. and fiberized by ball milling and double-pass disintegration. The thus-treated fiber was mixed with Portland cement and saturated lime-gypsum water to form an asbestos-cement slurry for the filtration tests. In the tests wherein the potential filter aid was added to the slurry of asbestos and cement, the addition of the potential filter aid to the slurry was made by mixing together the asbestos fiber, cement, and saturated lime-gypsum water, then adding the potential filter aid and/or reagent, and mixing further. In all tests the results of which are reported in Tables I and II which follow, the same ratio of asbestos fiber (treated and untreated) of Portland cement was used in preparing each asbestos-cement slurry, viz. 15 grams of asbestos fiber to 85 grams of cement. 650 cc. of saturated lime-gypsum water was also used in preparing each asbestos-cement slurry of such tests.

to separate the water from the asbestos-cement. The test results are set forth hereafter in Table II:

TABLE II

| Fiber | Liquid alum (cc.) | Distilled water (cc.) | Filtration time (seconds) | Filtration improvement (percent) |
|---|---|---|---|---|
| 4T3 | 0 | 0 | 68 | Control |
|  | 10 | 0 | 58 | 15 |
|  | 10 | 10 | 55 | 19 |
|  | 10 | 20 | 52 | 23.5 |
|  | 10 | 30 | 53 | 22 |
| 5R3 | 0 | 0 | 90 | Control |
|  | 10 | 10 | 71 | 20.5 |
|  | 10 | 20 | 69 | 23 |

TABLE I

| Asbestos fiber | Reagent Sprayed onto fiber | Reagent Added to asbestos-cement slurry | Filtration Time (sec.) | Filtration Δ time (sec.) | Filtration improvement (percent) |
|---|---|---|---|---|---|
| 4T3 SE-1115 | | | 55 | 0 | Control |
| 4T3 SE-1115 | $Al_2(SO_4)_3$ | | 47 | −8 | 15 |
| 4T3 SE-1115 | $AlCl_3$ | | 54 | −1 | 2 |
| 4T3 SE-1115 | $AlCl_3 + Na_2CO_3$ | | 56 | (+) | 0 |
| 4T3 SE-1115 | $Na_2CO_3$ | | 56 | (+) | 0 |
| 4T3 SE-1115 | $AlCl_3$ | Na oleate | 61 | (+) | 0 |
| 4T3 SE-1115 | $AlCl_3$ | $AlCl_3$ | 58 | (+) | 0 |
| 4T3 SE-1115 | $AlCl_3$ | $Na_2CO_3$ | 55 | 0 | 0 |
| 4T3 SE-1115 | $AlCl_3$ | $AlCl_3 + Na_2CO_3$ | 56 | (+) | 0 |
| 4T3 SE-8754 | | | 60 | 0 | Control |
| 4T3 SE-8754 | $Al_2(SO_4)_3$ | | 45 | −15 | 25 |
| 4T3 SE-8754 | | $Al_2(SO_4)_3$ | 59 | −1 | 2 |
| 4T3 SE-1115 | | | 54 | 0 | Control |
| 4T3 SE-1115 | $Al_2(SO_4)_3$ | | 42 | −12 | 22 |
| 4T3 SE-1115 | | $Al_2(SO_4)_3$ | 51 | −3 | 6 |
| 4T3 SE-1115 | | Na oleate | 59 | (+) | 0 |

In the foregoing Table I, the designations "SE–1115" and "SE–8754" mean two different samples of the same grade of fiber. As shown by the test data of Table I the application of the aluminum sulfate to the asbestos fiber increased the rate of filtration of the ultimate asbestos-cement slurry by about 15–25% whereas only an about 2–6% increase in the filtration rate was obtained by adding aluminum sulfate to the slurry of asbestos and cement. Also as shown by the test data of Table I, the application to the asbestos fiber of the following potential filter aids resulted in no increase in the filtration rate of the ultimate asbestos-cement slurry: aluminum chloride plus sodium carbonate, sodium carbonate alone. The application of aluminum chloride alone to the asbestos fiber resulted in only a 2% increase in the filtration rate of the ultimate asbestos-cement slurry.

The following test data of Table II also evidences the considerable improvement in the filtration rate of asbestos-cement aqueous slurries provided by utilizing therein as the asbestos fiber that having aluminum sulfate previously deposited on the fiber surfaces as compared with the use in the slurry of asbestos fiber not having aluminum sulfate deposited thereon. In the tests, commercial concentrated aqueous liquid alum solution was sprayed on 4T3 and 5R3 asbestos fiber at concentrations equivalent to 7.9 gallons of the commercial liquid per ton of fiber. Such fiber was obtained from ore mined in the vicinity of Black Lake, Province of Quebec, Canada. Various dilutions of the commercial concentrated liquid alum with distilled water were also sprayed on separate and similar quantities of the 4T3 and 5R3 asbestos-fiber. The thus-treated fiber was then dried for 15 minutes at 200° F. followed by fiberizing by ball milling for 60 minutes and double-pass disintegrating. Asbestos-cement aqueous slurries were then prepared utilizing the fiberized and opened fibers containing the alum, and filtration tests were run on the slurries to determine the filtration times required

I claim:
1. In a method of producing a water-laid asbestos-cement product by forming a water-laid product from the aqueous slurry by filtering the water therefrom, the improvement whereby an increased water filtration rate is attained which comprises utilizing as the asbestos fiber for forming the slurry an asbestos fiber having aluminum sulfate as sole filter aid previously deposited on surfaces of the fiber in an effective amount sufficient to result in the increased water filtration rate, the aluminum sulfate-treated asbestos fiber having been prepared by applying to only discrete asbestos fiber a liquid aqueous solution consisting essentially of aluminum sulfate, and collecting the thus-treated fiber having the aluminum sulfate as sole filter aid deposited thereon.

2. The method of claim 1 wherein the aluminum sulfate is deposited on the fiber surfaces by spraying a liquid solution of the aluminum sulfate on the fiber.

3. The method of claim 2 wherein the aluminum sulfate is deposited on the fiber in amount in the range of about 25–50 lbs. of the aluminum sulfate, calculated as $Al_2(SO_4)_3$, per ton of fiber.

4. The method of claim 1 wherein the fiber is chrysotile asbestos fiber.

References Cited
UNITED STATES PATENTS

| 3,535,150 | 10/1970 | Lipsett | 117—126 AF |
| 3,014,835 | 12/1961 | Feigley, Jr. | 162—154 |
| 2,568,023 | 9/1951 | Perry | 162—154 |
| 3,582,460 | 6/1971 | Lipsett | 117—126 AF |

S. LEON BASHORE, Primary Examiner

W. F. SMITH, Assistant Examiner

U.S. Cl. X.R.

162—182, 183

UNITED STATES PATENT OFFICE
CERTIFICATE OF CORRECTION

Patent No. 3,832,280             Dated August 27, 1974

Inventor(s) Charles E. Stiefken

It is certified that error appears in the above-identified patent and that said Letters Patent are hereby corrected as shown below:

Column 1, line 59, "pourous" should read -- porous --. Column 3, line 3, "the" should be inserted after "reducing" and before "materially"; line 10, "fomed" should read -- formed --; line 31, "cricidolite" should read -- crocidolite --; lines 39-41, the language "asbestos-cement water-laid products preparable in accordance with this invention are exemplified by" should be deleted. Column 6, line 34, after "forming" and before "a" the language -- an aqueous slurry of the cement and asbestos fiber, and forming -- should be inserted.

Signed and Sealed this tenth Day of February 1976

[SEAL]

Attest:

RUTH C. MASON
Attesting Officer

C. MARSHALL DANN
Commissioner of Patents and Trademarks